US008534558B2

(12) United States Patent
Miyoshi et al.

(10) Patent No.: US 8,534,558 B2
(45) Date of Patent: Sep. 17, 2013

(54) OPTICAL INFORMATION READER

(75) Inventors: Akihiro Miyoshi, Osaka (JP); Minoru Taneda, Osaka (JP); Yusuke Otsubo, Osaka (JP)

(73) Assignee: Keyence Corporation, Osaka (JP)

( * ) Notice: Subject to any disclaimer, the term of this patent is extended or adjusted under 35 U.S.C. 154(b) by 327 days.

(21) Appl. No.: 12/868,782

(22) Filed: Aug. 26, 2010

(65) Prior Publication Data
US 2011/0068174 A1 Mar. 24, 2011

(30) Foreign Application Priority Data
Sep. 18, 2009 (JP) .................. 2009-218149

(51) Int. Cl.
*G06K 7/10* (2006.01)
*G06K 7/14* (2006.01)

(52) U.S. Cl.
USPC ............. 235/462.11; 235/462.01; 235/454; 235/462.43

(58) Field of Classification Search
USPC ............ 235/462.01, 462.11, 462.43, 454; 382/312
See application file for complete search history.

(56) References Cited

U.S. PATENT DOCUMENTS

| 5,231,275 | A  | * | 7/1993  | Wakaumi et al.    | 235/449    |
|-----------|----|---|---------|-------------------|------------|
| 5,504,367 | A  | * | 4/1996  | Arackellian et al.| 235/462.42 |
| 5,684,290 | A  | * | 11/1997 | Arackellian et al.| 235/462.42 |
| 5,808,289 | A  | * | 9/1998  | Becker            | 235/472.01 |
| 5,821,512 | A  | * | 10/1998 | O'Hagan et al.    | 235/383    |
| 5,886,338 | A  | * | 3/1999  | Arackellian et al.| 235/472.01 |
| 7,743,997 | B2 | * | 6/2010  | Copeland et al.   | 235/472.01 |
| 2001/0001878 | A1 | * | 5/2001 | Isaac et al.     | 713/320    |
| 2001/0017321 | A1 | * | 8/2001 | Knowles et al.   | 235/462.44 |
| 2001/0038038 | A1 | * | 11/2001 | Rando et al.    | 235/462.45 |
| 2001/0040682 | A1 | * | 11/2001 | Lindsay et al.  | 356/520    |
| 2002/0111912 | A1 | * | 8/2002 | Hunter et al.    | 705/52     |
| 2002/0145048 | A1 | * | 10/2002 | Liou et al.     | 235/472.03 |
| 2002/0148901 | A1 | * | 10/2002 | Barkan et al.   | 235/462.43 |
| 2003/0019934 | A1 | * | 1/2003 | Hunter et al.    | 235/462.2  |
| 2003/0222144 | A1 | * | 12/2003 | Meier et al.    | 235/454    |
| 2003/0226893 | A1 | * | 12/2003 | Okada et al.    | 235/454    |
| 2004/0046031 | A1 | * | 3/2004 | Knowles et al.   | 235/462.46 |
| 2004/0089720 | A1 | * | 5/2004 | Barkan et al.    | 235/462.37 |
| 2004/0169084 | A1 | * | 9/2004 | Tamburrini et al.| 235/462.38 |
| 2005/0224583 | A1 | * | 10/2005 | Tamburrini et al.| 235/472.01 |
| 2006/0023428 | A1 | * | 2/2006 | McClure et al.   | 361/724    |
| 2006/0097054 | A1 | * | 5/2006 | Biss et al.      | 235/462.45 |
| 2007/0170259 | A1 | * | 7/2007 | Nunnink et al.   | 235/462.21 |
| 2011/0068174 | A1 | * | 3/2011 | Miyoshi et al.   | 235/462.11 |
| 2011/0297746 | A1 | * | 12/2011 | Biss et al.     | 235/462.2  |

FOREIGN PATENT DOCUMENTS

| JP | 2000-306038 | 11/2000 |
|----|-------------|---------|
| JP | 2008-033465 | 2/2008  |

* cited by examiner

*Primary Examiner* — Daniel Walsh
(74) *Attorney, Agent, or Firm* — Kilyk & Bowersox, P.L.L.C.

(57) ABSTRACT

In an optical information reader, an entire size is reduced while a space for accommodating an imaging unit, a space for accommodating a cable of an external interface, and a space for accommodating plural boards in which circuits of a signal processing unit are accommodated are secured. An entire size of a housing is determined based on sizes of a main board and an imaging unit to realize an optical information reader having a minimum shape. The main board has the largest area as a board, and a CPU and a memory are mounted thereon. The imaging unit includes a camera module, a lighting LED unit, and a marker. The main board is disposed near an internal wall of a housing. Other functions are functionally divided into sub-boards and disposed around a frame body, and a connection portion to the cable is accommodated in the frame body to achieve miniaturization.

9 Claims, 22 Drawing Sheets

OPTICAL INFORMATION READER

CROSS-REFERENCE TO RELATED APPLICATIONS

The present application claims foreign priority based on Japanese Patent Application No. 2009-218149, filed Sep. 18, 2009, the contents of which is incorporated herein by reference.

BACKGROUND OF THE INVENTION

1. Field of the Invention

The present invention is generally related to an optical information reader that optically decodes a two-dimensional code and the like, particularly to a structure of an optical information reader having a two-dimensional image sensor.

2. Description of the Related Art

Conventionally, an optical information reader is disposed near a conveyance line of an object to decode a two-dimensional code such as a QR code or a barcode, which is attached, printed, or stamped to a surface of the object moving along the conveyance line or is printed or stamped, and the moving object is identified by the decode two-dimensional code. For example, an optical information reader disclosed in Japanese Unexamined Patent Publication No. 2008-33465 includes an imaging unit that images the two-dimensional code, a control unit including a signal processing unit that performs analog processing or digital processing to a voltage signal from the imaging unit to decode the two-dimensional code, and an interface (hereinafter referred to as I/F) that outputs the processing result of the control unit. In the optical information reader disclosed in Japanese Unexamined Patent Publication No. 2008-33465, components constituting the units are accommodated in a housing.

In such an optical information reader, it is necessary to secure a space for accommodating a cable of an external I/F and a space for accommodating a plurality of boards in which circuits of the control unit are accommodated, in addition to a space for accommodating the imaging unit. In order to realize reduction of an entire size, it is necessary to design a component layout. In designing the component layout, it is necessary to simultaneously consider a structure for positioning the components constituting the units in the housing, ease of assembly, a heat radiation countermeasure, a noise-resistant property, and the like.

SUMMARY OF THE INVENTION

In view of the foregoing, an aspect of the present invention includes providing an optical information reader in which disposition density of components constituting each unit is enhanced in the housing to achieve miniaturization.

One embodiment of the present invention provides an optical information reader comprising an imaging unit including a two-dimensional imaging element that images a reading target; a signal processing unit that processes (decodes) a signal from the imaging unit; a power supply unit that supplies electric power to the imaging element and the signal processing unit; a cable that is connected to the signal processing unit and the power supply unit; a housing that includes a light transmission window; and a frame body that is detachably fixed to an inside of the housing, wherein the signal processing unit and the power supply unit are fixed to the frame body, one end of the cable is accommodated in the frame body, and the imaging unit is accommodated between the light transmission window of the housing and the frame body. Therefore, the miniaturization can be realized in consideration of the layout in which characteristics of the imaging unit including the two-dimensional imaging element are considered, that is, the layout in which a reflection in front of the imaging unit is suppressed by bringing the imaging unit into close contact with the light transmission window. The positioning and assembly is easily performed by the use of the frame body, the cable accommodation space is secured, which allows the cable to be stably connected. The use of the frame body decreases the number of complicated fixing parts in attaching the component to the housing, so that the assembly workability can be improved by simplifying the housing assembly. It is not necessary to insert a tool in the housing, the assembly becomes easy, and the miniaturization can be realized.

Herein, the signal processing unit and the power supply unit may include a main board and sub-board, an electronic circuit of the signal processing unit that processes the signal from the imaging unit may be mounted on the main board, the sub-board may include a rigid flexible board that joins: an I/O board on which a connection terminal of the cable, a communication circuit unit, and an input/output interface circuit are mounted; a power supply board including the power supply unit that supplies power to each unit; a coupling board on which a connector is mounted to connect the main board; a display board on which an element displaying an operating state of a two-dimensional code reader is mounted; and a lighting board on which a lighting element is mounted to light a region for imaging with a camera module, using a planar conduction unit, the I/O board, the power supply board, the coupling board, and the display board may be disposed so as to surround the frame body, and the lighting board may be disposed so as to be located in front of the power supply board.

Herein, the coupling board may be retained above the frame body, and the main board may be fixed to the frame body after the coupling board is connected to the main board through the connector, whereby the coupling board is fixed while being sandwiched therebetween.

Herein, the imaging unit may include: a camera module in which the two-dimensional imaging element is disposed in a lens holder; a pair of lighting units that lights the reading target, the lighting units being disposed while deviated downward from a lateral portion of a lens barrel of the camera module; and a pair of positioning markers that indicates an imaging position of the camera module, the positioning markers being disposed while deviated upward from a lateral portion of the camera module.

Herein, a cylindrical elastic member may be provided at a leading end of the lens barrel of the lens holder, and a surface of the elastic member may be made of a resin material.

Herein, the housing may be made of a magnesium material, the housing may include: a zinc tape that adheres to an internal wall of the housing; and a copper tape that has an opening in a center thereof, the copper tape adhering to the zinc tape, and the main board may include a contact that is projected from the internal wall of the housing to come into contact with the zinc tape.

Herein, the housing may be made of a magnesium material, and a screw may be attached from an inside of the housing to mount a contact on the main board, the contact having a nickel coating that comes into contact with the screw.

According to one embodiment of the present invention having such characteristics, an entire size of the housing can be determined based on the sizes of the main board and the imaging unit to realize the optical information reader having the minimum shape. The main board has the largest area as the board, and the CPU and the memory are mounted on the main board. The imaging unit includes the camera module, the lighting LED unit, and the sighting marker. The main board is disposed near the internal wall of the housing, other functions are functionally divided into sub-boards and disposed around the frame body, and the connection portion to the cable is accommodated in the frame body. Therefore, the miniaturization can be realized.

DETAILED DESCRIPTION OF THE INVENTION

Figure 1:
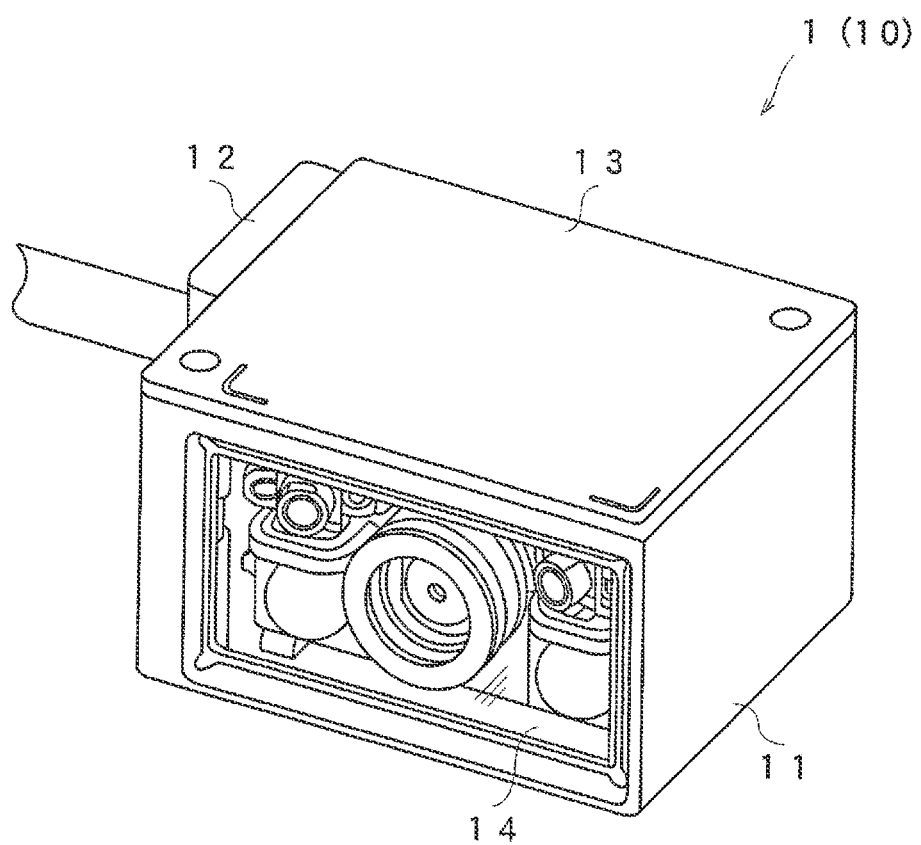
FIG. 1 is a perspective view illustrating a two-dimensional code reader according to an embodiment of the present invention.
Figure 2A:
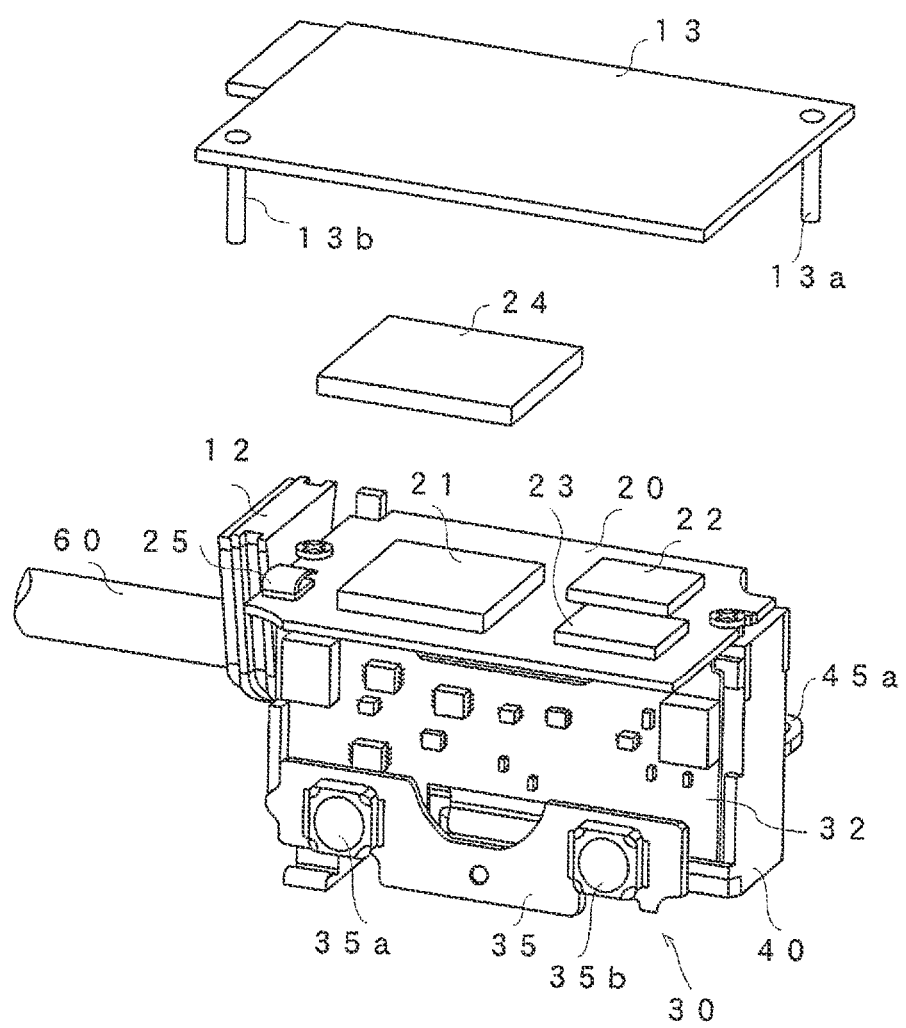
FIG. 2A is an assembly perspective view of the two-dimensional code reader of the present embodiment (part 1)
Figure 2B:
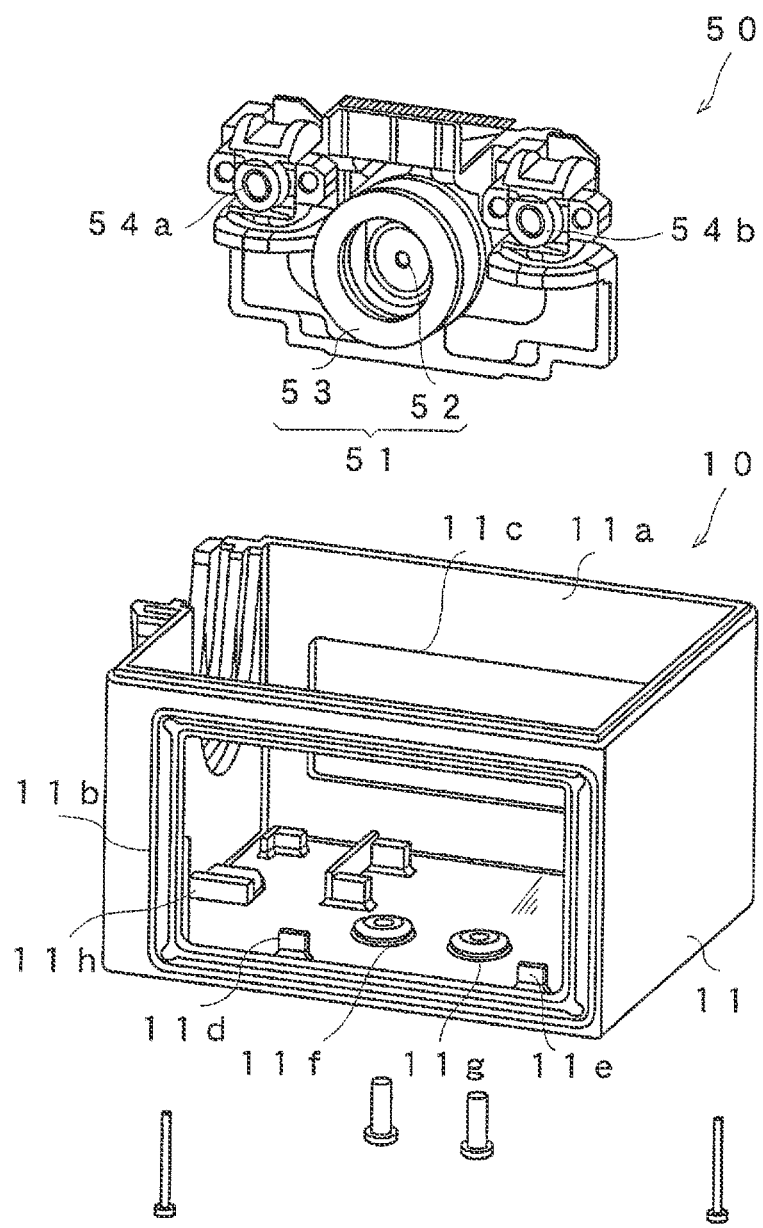
FIG. 2B is an assembly perspective view of the two-dimensional code reader of the present embodiment (part 2)

A code reader including a two-dimensional imaging element according to an embodiment of the present invention will be described below with reference to the drawings. FIG. 1 is a perspective view illustrating a two-dimensional code reader 1 of the present embodiment, and FIGS. 2A and 2B are assembly perspective views of the two-dimensional code reader 1. For example, the two-dimensional code reader 1 is a compact optical information reader having a substantially rectangular solid shape having a height of about 24 mm, a width of about 39 mm, and a depth of about 32 mm. The two-dimensional code reader 1 is disposed adjacent to a conveyance line for commercial goods or products, in which a two-dimensional barcode is printed or stamped, to read information recorded in the two-dimensional barcode.

As illustrated in FIG. 2A, the two-dimensional code reader 1 of the present embodiment includes a main board 20 and a sub-board 30 in a housing 10, and the main board 20 and the sub-board 30 are retained around a frame body 40 fixed to the housing 10. The housing 10 is formed into a sealed rectangular solid shape by a case 11, a cable bush 12, a cover 13, a transparent glass plate 14, and a below-described flexible sheet 15 that closes an opening of a rear surface. The case 11 includes an opening 11a in an upper surface. In the cases 11, a light transmission window 11b to which a glass plate 14 is attached is formed in a front surface, and a display window 11c is formed in a rear surface. Inside a bottom plate of the case 11, there are provided bosses 11d and 11e configured to position a camera holder, openings 11f and 11g for screws, a boss 11h configured to retain the frame body 40, and the like. In the present embodiment, the case 11 and the cover 13 are formed by magnesium die casting in order to reduce weights and simplify forming. A camera holder 50 is attached between the glass plate 14 of the case 11 and the frame body 40 in the case 11. Two legs 13a and 13b are provided inward in the cover 13, and the legs 13a and 13b are used to screw the frame body 40 and the case 11, respectively.

Figure 3:
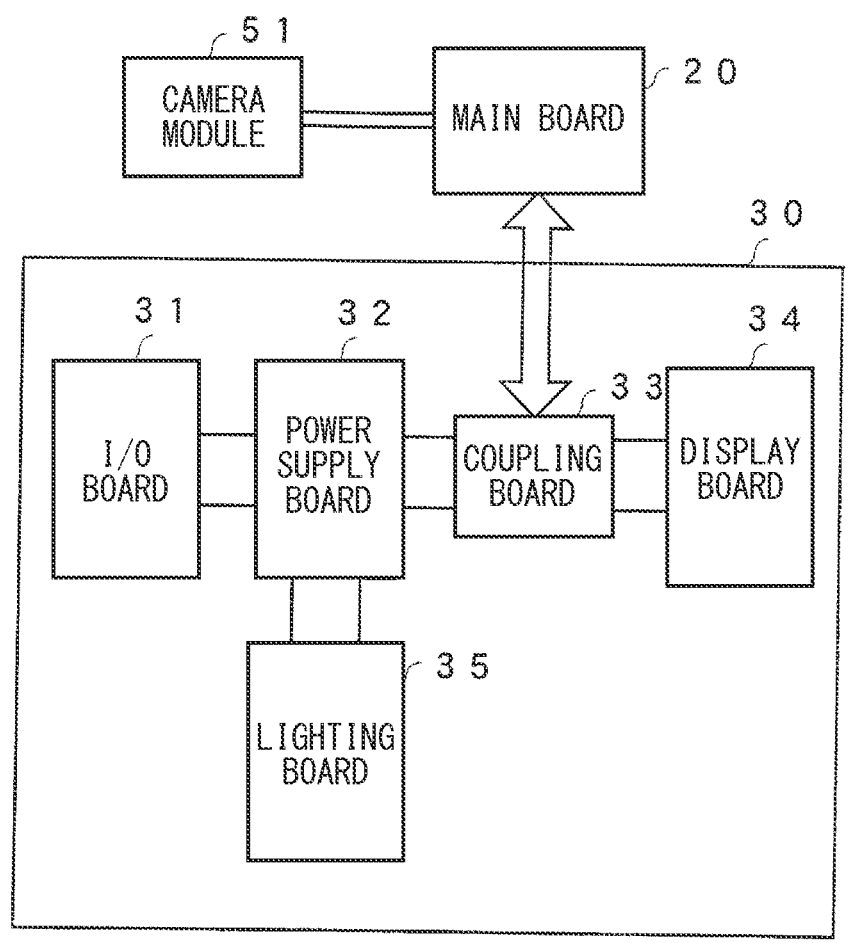
FIG. 3 is a block diagram illustrating an electronic circuit portion including a main board, a sub-board, and an imaging unit in the two-dimensional code reader of the present embodiment.

FIG. 3 is a block diagram illustrating details of an electronic circuit portion including the main board 20 and the sub-board 30. An electronic circuit of a signal processing unit that processes a signal from a camera module 52 is mounted on the main board 20. As illustrated in FIG. 2A, a CPU 21, a SDRAM 22, a flash ROM 23, and the like are mounted on the main board 20, and the elements are connected through a system bus. The main board 20 has a largest area as the board, and is attached closest to the cover because the main board 20 generates heat. In this case, a radiator rubber 24 may be provided between the CPU 21 and the cover 13 while being in contact with the CPU 21 and the cover 13, thereby improving a radiation effect. A connection unit 25 is provided in the upper surface of the main board 20 in order to electrically connect to the cover 13. The detailed connection unit 25 will be described later.

Figure 4A:
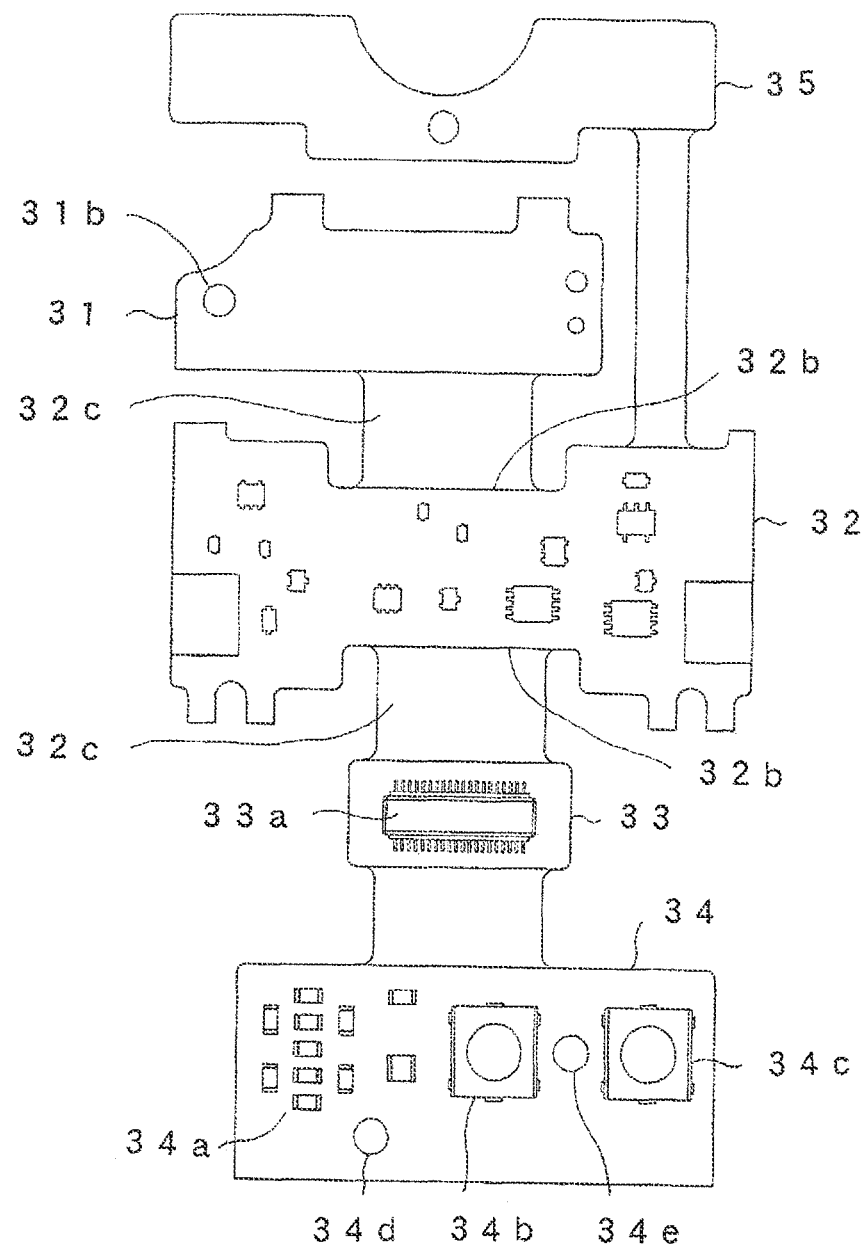
FIG. 4A illustrates a detail of one of surfaces of the sub-board.
Figure 4B:
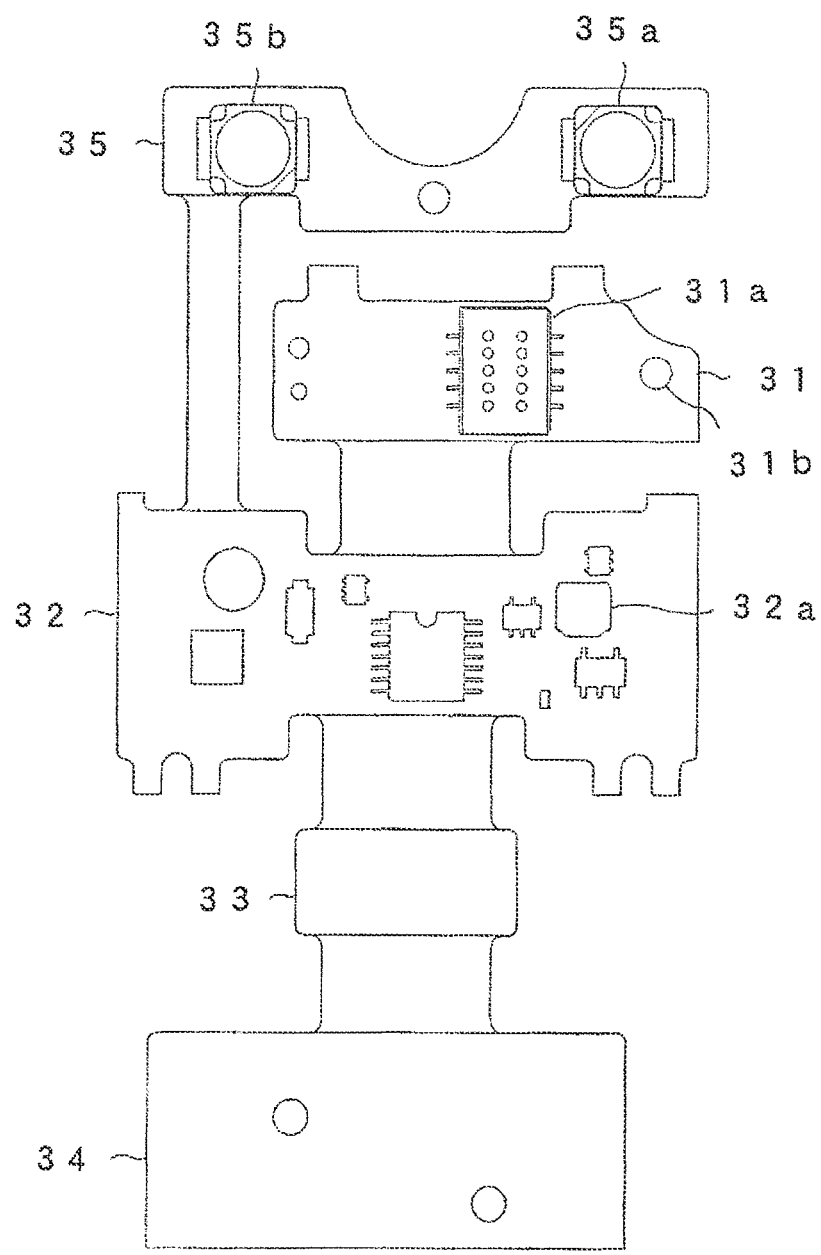
FIG. 4B illustrates a detail of the other surface of the sub-board.

The sub-board 30 includes a power supply unit and a rigid flexible board that joins a plurality of boards, into which remaining block is functionally separated, using a flexible board. The flexible board is a planar electric conduction unit. FIG. 4A illustrates a detail of the sub-board 30 when viewed from one (the surface that becomes an outside when the sub-board is attached to the frame body) of surfaces of the sub-board 30, and FIG. 4B illustrates a detail of the sub-board 30 when viewed from the other surface (the surface that becomes an inside when the sub-board is attached to the frame body). As illustrated in FIGS. 4A and 4B, the sub-board 30 includes an I/O board 31, a power supply board 32, a coupling board 33, a display board 34, and a lighting board 35. A communication circuit that conducts communication with an external device and an input/output interface circuit are mounted on the I/O board 31, a terminal 31a of a cable 60 is mounted on the I/O board 31 in order to connect a serial I/O signal, and a tapped hole 31b is made in the I/O board 31 in order to fix the I/O board 31 to the case 11. The power supply board 32 includes a power supply unit, an LED driver unit, and a driver unit. The power supply unit that supplies electric power to each unit includes an inductor 32a and a power supply IC. The LED driver unit drives an LED that acts as lighting. The driver unit drives an LD element that acts as a sighting marker. A stacking connector 33a is mounted on the coupling board 33 to join the main board 20 and the sub-board 30. The display board 34 includes a display LED group 34a that displays an operating state of the two-dimensional code reader 1, switches 34b and 34c for input, and positioning holes 34d and 34e. A pair of LEDs 35a and 35b is mounted on the lighting board 35. The LED 35a and 35b constitute a lighting unit that lights a region imaged by a camera module 51.

As illustrated in FIGS. 4A and 4B, in the sub-board 30, high-profile elements such as the cable connection terminal and the inductor are disposed inside. Therefore, a leading end portion of the cable is easily accommodated in the frame body, and a distance between the frame body and the housing can be shortened when the sub-board 30 is accommodated in the housing while attached around the frame body 40.

Additionally, a notch portion is provided in a connection portion 32b to the flexible board of the power supply board 32 to secure a length of the flexible board. Therefore, when the sub-board 30 is attached around the frame body, a compact rectangular solid shape can be formed while a bending margin of the flexible board 32c is secured.

Figure 5A:
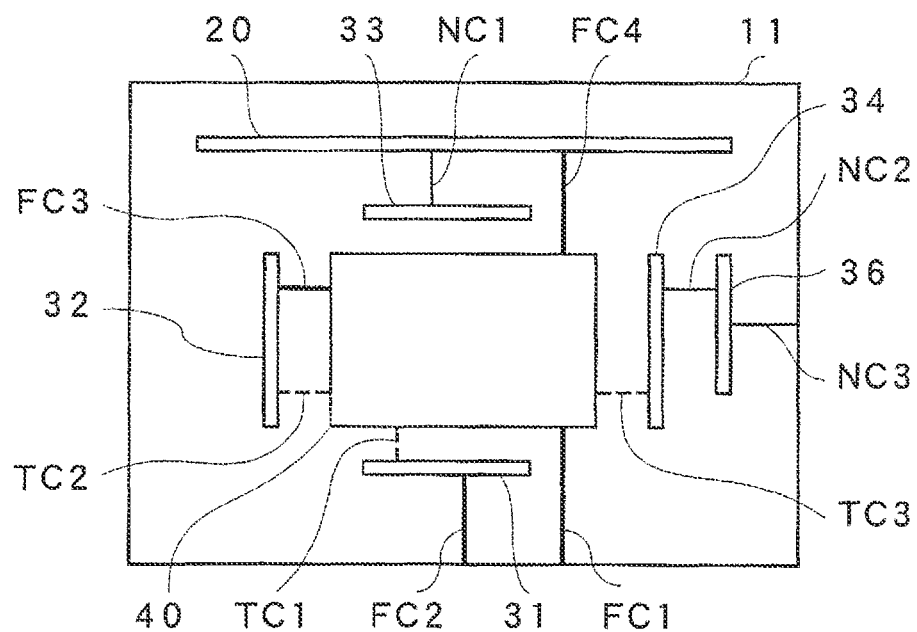
FIG. 5A is a conceptual diagram illustrating a connection state between a case and each board.
Figure 5B:
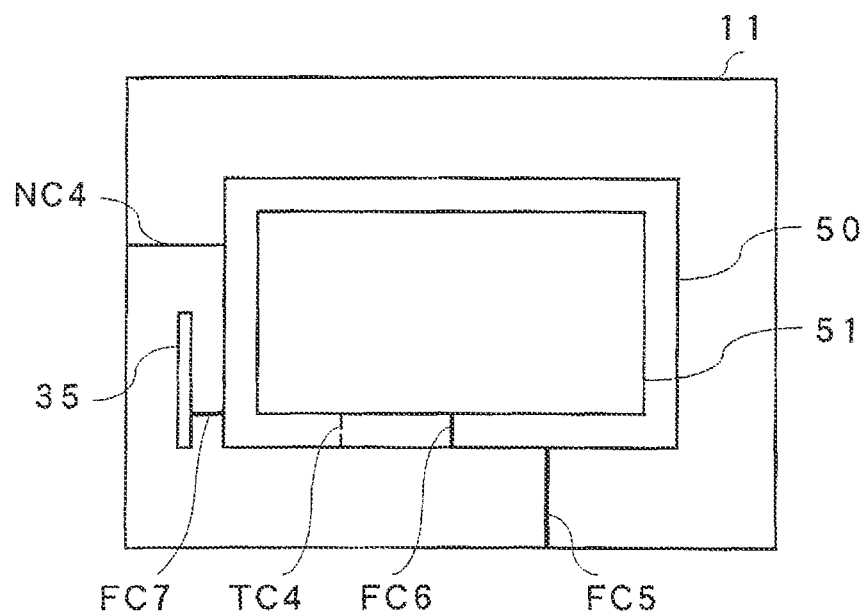
FIG. 5B is a schematic view illustrating a connection state between the case and a camera holder.

In the present embodiment, all of the boards and all of the modules are directly or indirectly and strongly fixed to the case 11. FIGS. 5A and 5B are conceptual diagrams illustrating the connection state thereof. In FIGS. 5A and 5B, fixing units FC1 to FC7 expressed by bold lines are fixing units in which strong coupling method such as a screw is adopted. Coupling units NC1 to NC4 expressed by solid lines are structural coupling units, and a coupling degree of each of the coupling units NC1 to NC4 are normal. For example, the coupling units NC1 to NC4 can be realized by a stacking connector, the coupling of an opening and a boss, and the positioning and coupling according to member shape. Tentative joint units TC1 to TC3 expressed by broken lines are positioning and tentatively joining units during production. The tentative joint units TC1 to TC3 such as a hook have tentative joint functions, and a coupling force of the tentative joint unit is weakest.

As illustrated in FIG. 5A, the frame body 40 and the I/O board 31 are fixed to the case 11 by the fixing units FC1 and FC2, respectively, and the power supply board 32 is fixed to the frame body 40 by the fixing unit FC3. The main board 20 is fixed to the frame body 40 by the fixing unit FC4. The I/O board 31, the power supply board 32, and the display board 34 are tentatively joined to the frame body 40 by the tentative joint units TC1, TC2, and TC3, respectively. The coupling board 33 is joined to the main board 20 by the coupling unit NC1. The coupling between the frame body 40 and the sub-board such as the I/O board 31 is loosened to provide play, thereby facilitating the positioning and assembly in fixing the main board 20 that is joined with the coupling board 33 interposed to the frame body 40. The display board 34 is joined to an LED spacer 36 by the coupling unit NC2, and the LED spacer 36 is joined to the case 11 by the coupling unit NC3. Although not illustrated, the boards constituting the sub-board 30 are joined to one another by the flexible board as described above.

As illustrated in FIG. 5B, the camera holder 50 is fixed to the case 11 by the fixing unit FC5, and is joined by the coupling unit NC4 that regulates a tilt direction. Because accuracy is required for the alignment of a camera optical system, the camera holder 50 is directly fixed to the case 11, whereby a position deviation and an angle deviation are hardly generated. The lighting board 35 is fixed to the camera holder 50 by the fixing unit FC7. The camera module 51 is tentatively joined to the inside of the camera holder 50 by the tentative joint unit TC4, and is fixed by the fixing unit FC6.

An internal structure of the two-dimensional code reader 1 of the present embodiment will be described in more detail with reference to the drawings. First, the connection state among the frame body 40, the main board 20, and the sub-board 30 will be described with reference to FIGS. 6 to 10. As illustrated in FIGS. 7 to 10, the frame body 40 has a substantially rectangular solid shape. In the frame body 40, there are provided hooks 41a and 41b configured to attach the power supply board 32, a pair of hooks 42a and 42b configured to attach the display board 34 to the rear surface of the frame body 40, tapped holes 43a and 43b configured to attach the power supply board 32, tapped holes 44a and 44b configured to fix the main board 20, tapped holes 45a and 45b configured to fix the frame body 40 to the case 11, a pair of hooks 46a and 46b configured to attach the I/O board 31, and a U-shape notch 47 configured to insert the cable 60.

Figure 6:
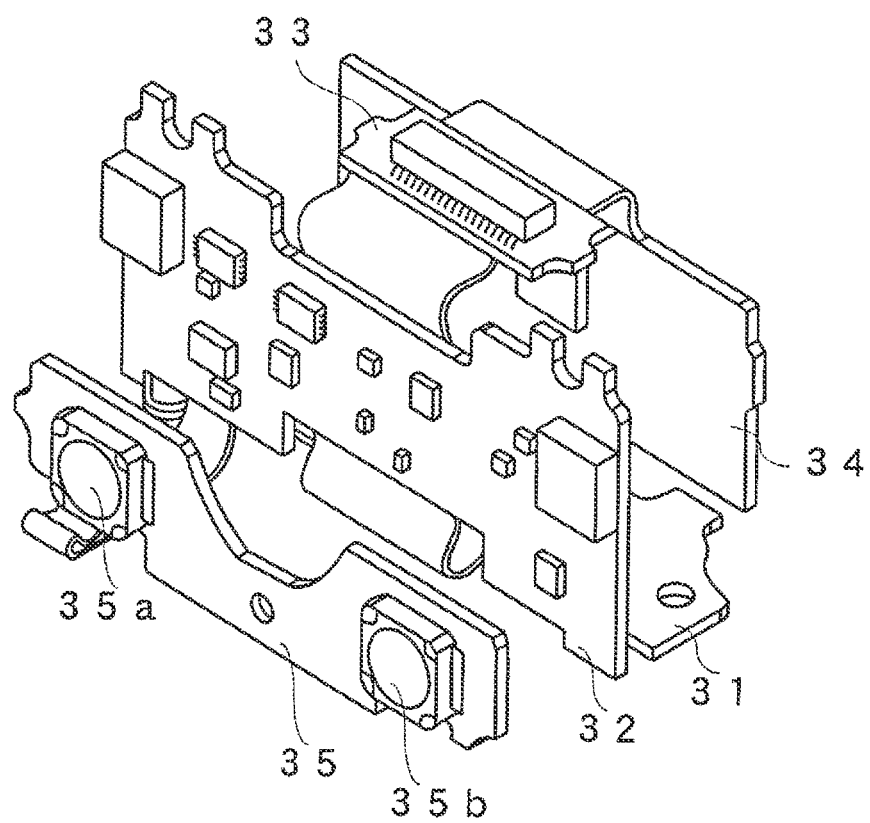
FIG. 6 is a perspective view illustrating a disposition of each board of the sub-board while a frame body is removed.

The sub-board 30 is disposed around the frame body 40, and the main board 20 is disposed above the sub-board 30. FIG. 6 is a perspective view illustrating a disposition of the sub-board 30 while the frame body 40 is removed. As illustrated in FIGS. 2A and 6, the I/O board 31, the power supply board 32, the coupling board 33, and the display board 34 are disposed so as to surround the frame body 40. More particularly, the sub-board 30 is disposed such that the coupling board 33 is located above the frame body 40, the power supply board 32 is located in front of the frame body 40, the display board 34 is located symmetrical to the power supply board 32, and the I/O board 31 is located below the frame body 40. Further, the sub-board 30 is disposed such that the lighting board 35 is located in front of the power supply board 32.

Figure 7:
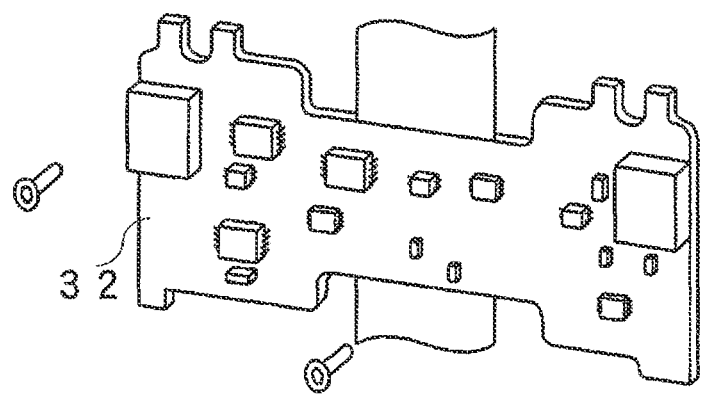
FIG. 7 is a perspective view illustrating a connection state between the frame body and a power supply board.
Figure 7:
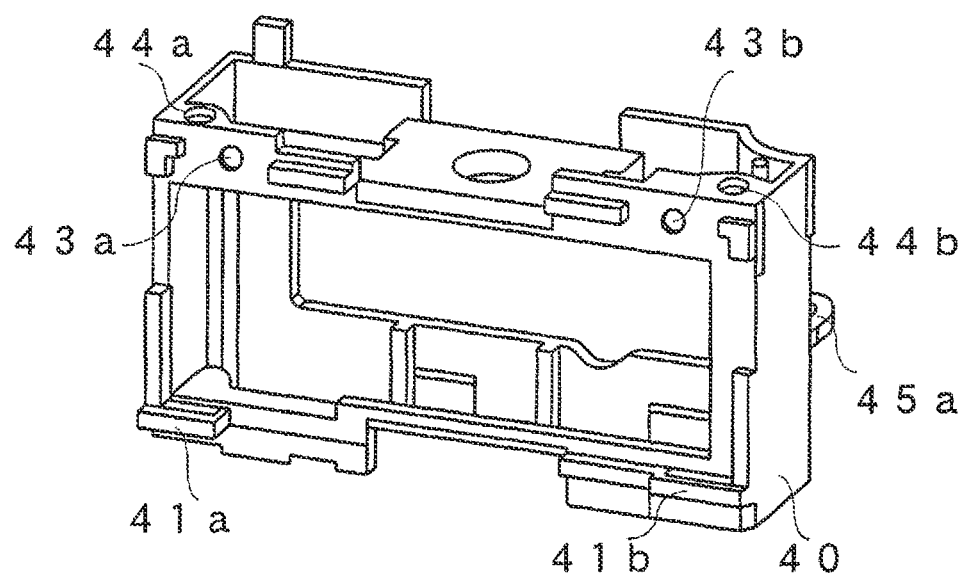
Figure 8:
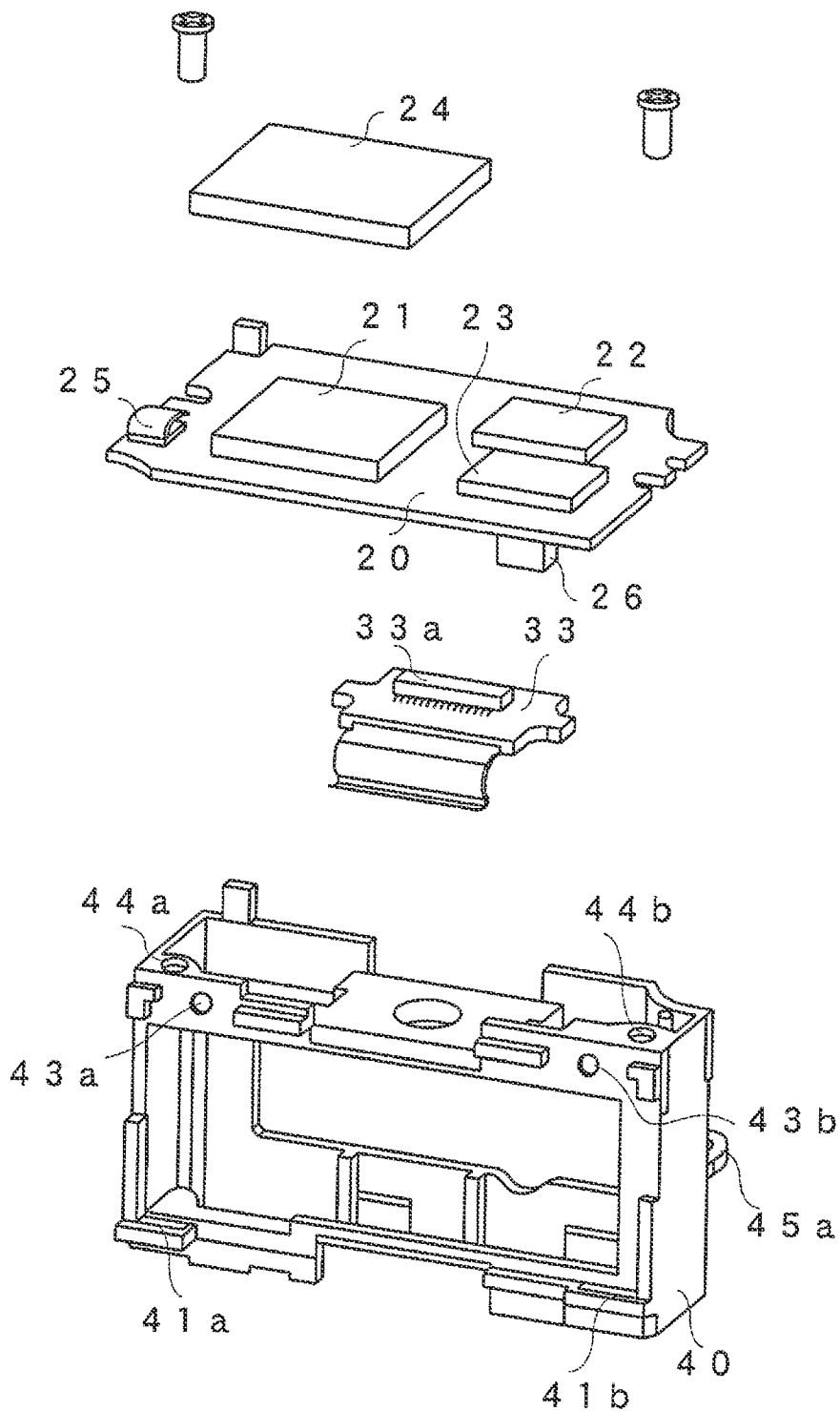
FIG. 8 is a perspective view illustrating a connection state among the frame body, a coupling board, and the main board.
Figure 9A:
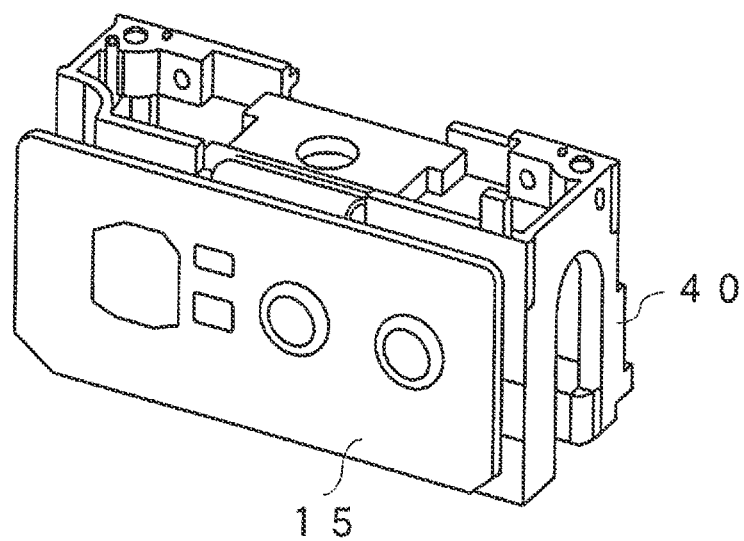
FIG. 9A is a perspective view illustrating a connection state among the frame body, a display board, and an LED spacer.
Figure 9B:
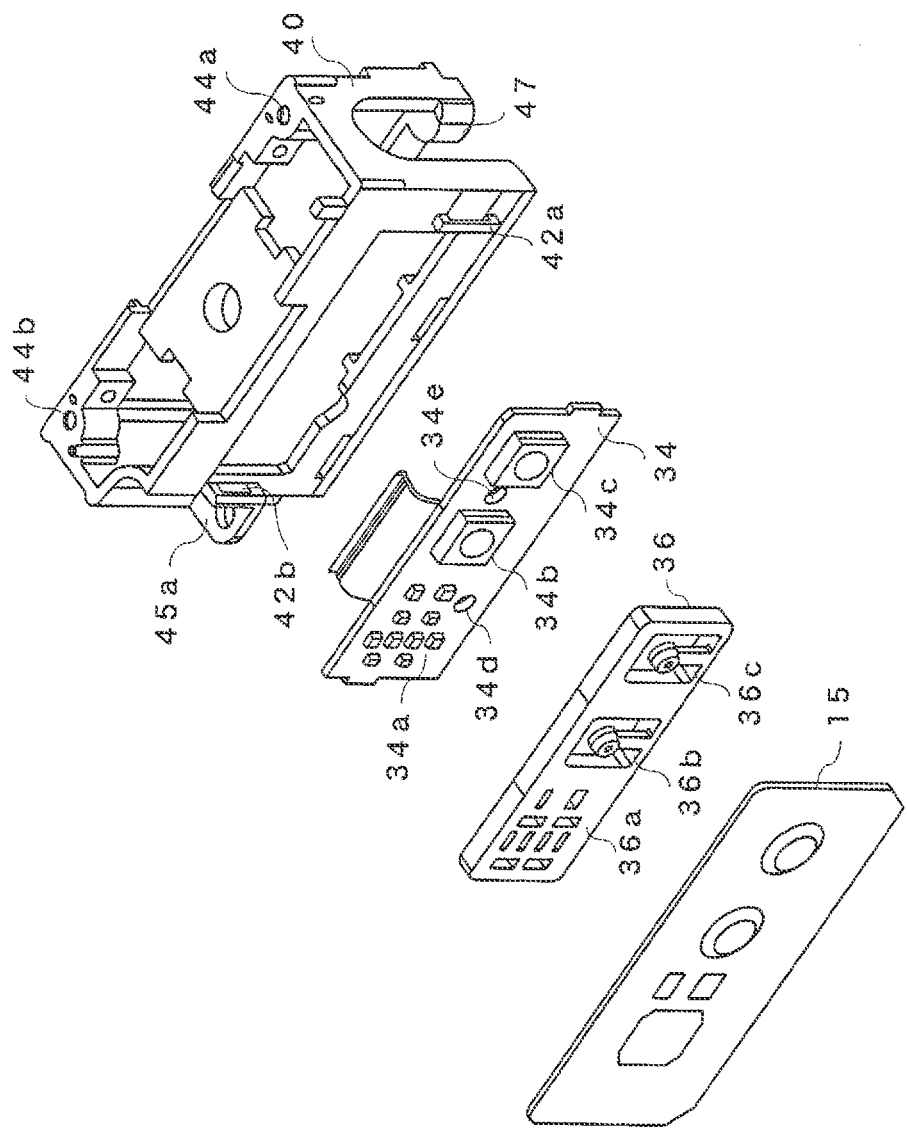
FIG. 9B is a perspective view illustrating an assembly state of the frame body, the display board, the LED spacer, and a sheet.

Assembly will be described in detail below. As illustrated in FIG. 7, the power supply board 32 is inserted from the outside into the hooks 41a and 41b in the lower portion of one of the surfaces of the frame body 40, and the power supply board 32 is tentatively joined. Then the power supply board 32 is fixed to the frame body 40 by a screw in the tapped holes 43a and 43b. The coupling board 33 is disposed above the frame body 40 as illustrated in FIG. 8, and the display board 34 is tentatively joined to the rear surface of the frame body 40 by the hooks 42a and 42b as illustrated in FIGS. 9A and 9B.

Bosses (not illustrated) of the LED spacer 36 are joined from the outside of the display board 34 while aligned with the holes 34d and 34e.

In the LED spacer 36, many openings 36a are formed at a position at which the display LED group 34a is provided, and U-shape notches 36b and 36c are formed at positions corresponding to the push-button switches 34b and 34c so as to be able to be bent in a direction perpendicular to the board. The LED spacer 36 enters a frame inside the display window 11c of the case 11, thereby attaching the LED spacer 36 to the position of the display window 11c. Therefore, the display of the LED can be confirmed through the sheet 15 adhering to the display window 11c, or a user can manipulate the switch.

Figure 10:
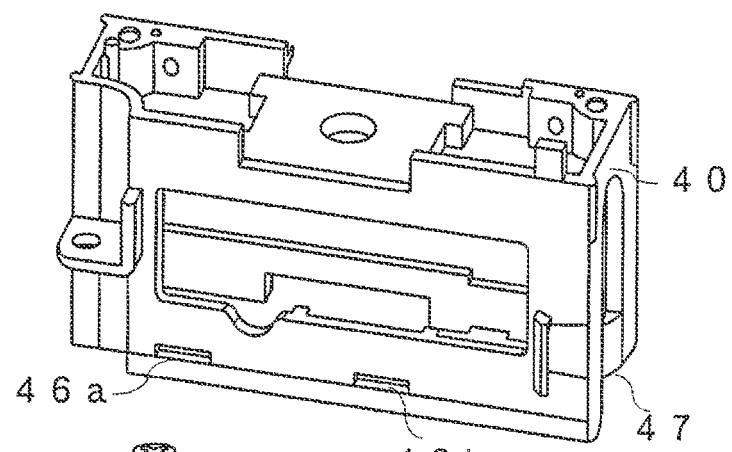
FIG. 10 is a perspective view illustrating a connection state among a case, the frame body, and each board of an I/O board.
Figure 10:
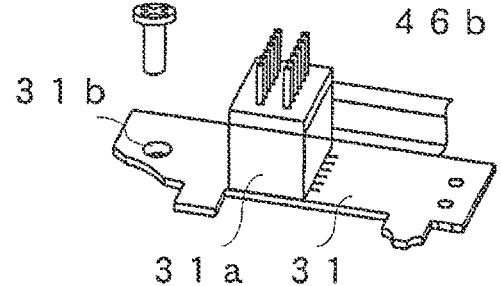
Figure 10:
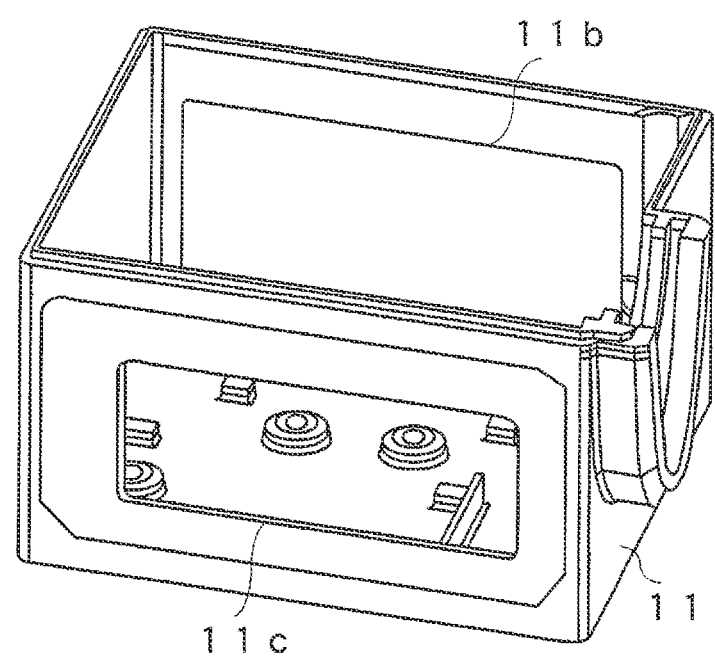

FIG. 10 illustrates the I/O board 31 and the frame body 40, which are fixed to the inside of the case 11 of the housing 10. The I/O board 31 is disposed while the terminal 31a is oriented toward the inside of the frame body 40, and the I/O board 31 is tentatively joined to a lower surface of the frame body 40 from the inside by the hooks 46a and 46b. A cable (not illustrated) is connected to the terminal 31a, and the cable is taken out through a U-shape notch 47. The I/O board 31 is fixed to the case 11 by a screw in the tapped hole 31b. The screw securely fixes the case 11 and the sub-board 30, and the frame is grounded.

Figure 11:
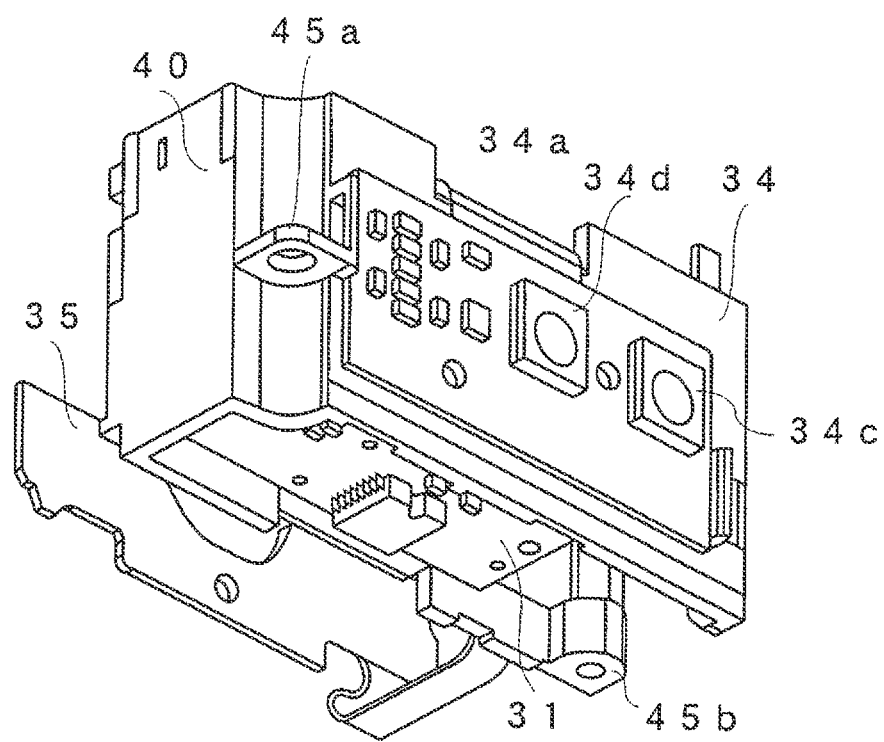
FIG. 11 is a perspective view illustrating the frame body to which each board of the sub-board is attached when viewed from below.

FIG. 11 is a perspective view illustrating the state in which each board of the sub-board is attached to the frame body 40 when viewed from below. Referring to FIG. 11, the I/O board 31 is attached to a bottom surface of the frame body 40, the display board 34 is attached to one of side surfaces, and the lighting board 35 is located in front of the frame body 40 on the opposite side to the display board 34. The lighting board 35 is screwed to the camera holder.

Figure 12:
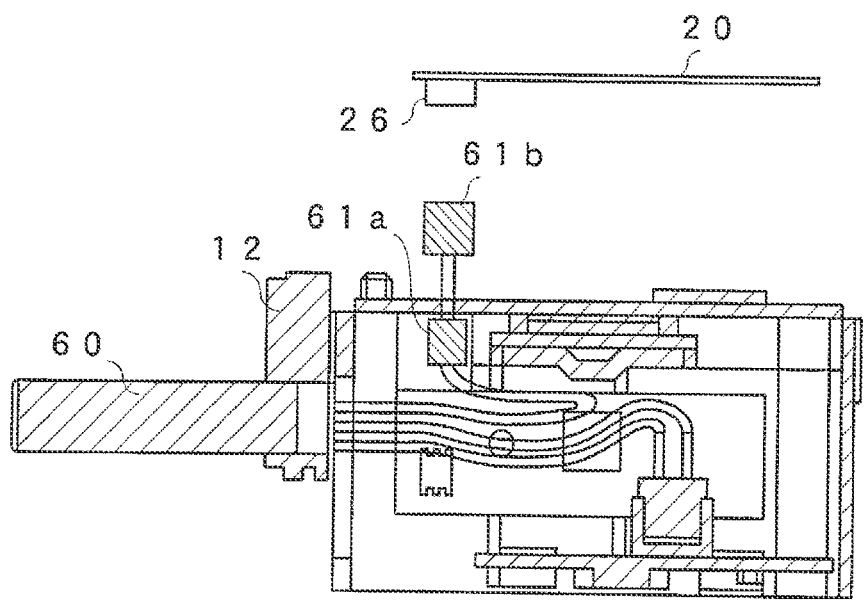
FIG. 12 is a sectional view illustrating a connection state between a cable and a terminal of the I/O board in the case.

FIG. 12 is a sectional view illustrating the state in which a terminal of the cable 60 is connected to the terminal 31a of the I/O board 31. As illustrated in FIG. 12, terminals of the cable 60 are connected in the frame body 40. Some lines of the cable 60 pass through a ferrite ring 61a in order to reduce a noise. A connector 61b is provided in an end portion of the line in order to connect to a connector 26 provided in the main board 20.

As illustrated in FIG. 8, the main board 20 is connected to the USB connector 61b of the cable 60 through the connector 33a of the coupling board 33 and the connector 26, and then the main board 20 is fixed by a screw from above the frame body 40. The radiator rubber 24 is also provided on the CPU 21 of the main board 20 so as come into contact with the cover 13.

Figure 13:
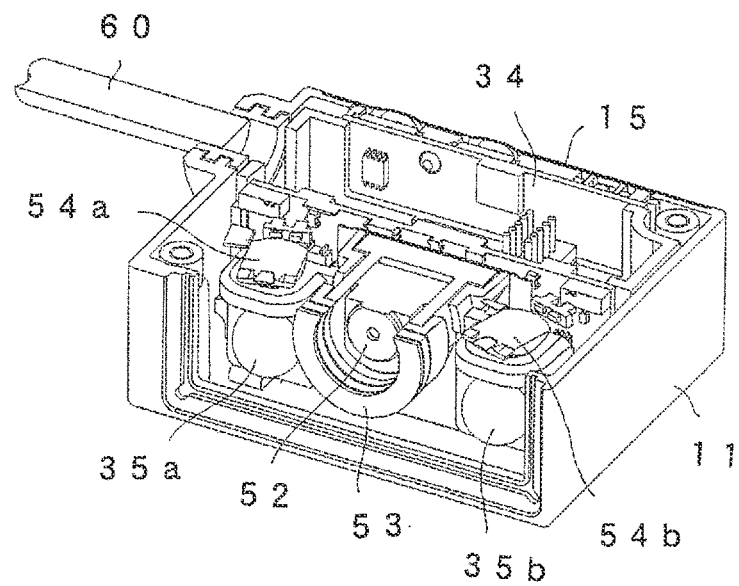
FIG. 13 is a perspective view illustrating a central transverse section of the two-dimensional code reader of the present embodiment.
Figure 14:
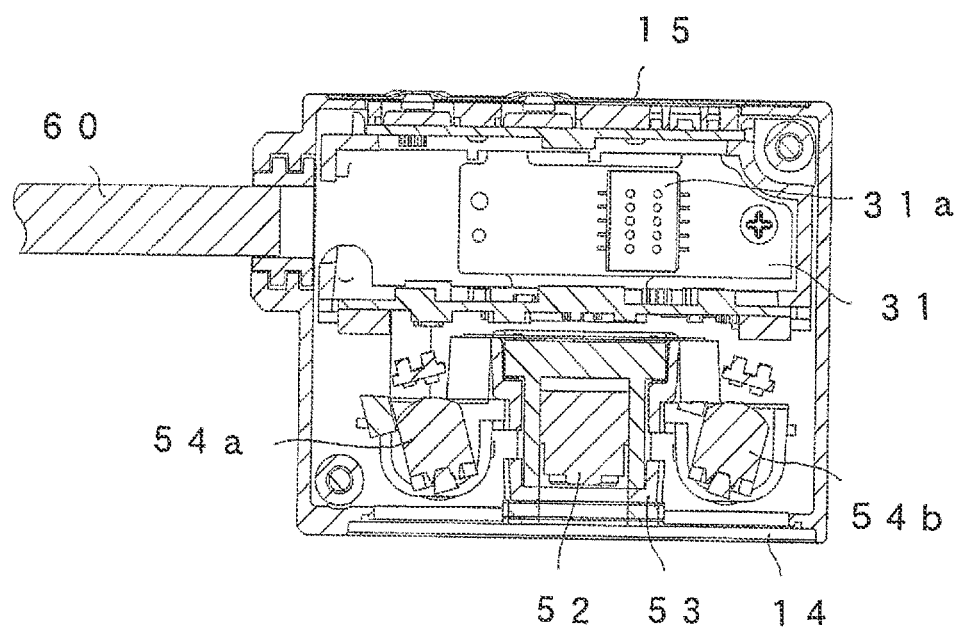
FIG. 14 is a central transverse sectional view of the two-dimensional code reader of the present embodiment.
Figure 15:
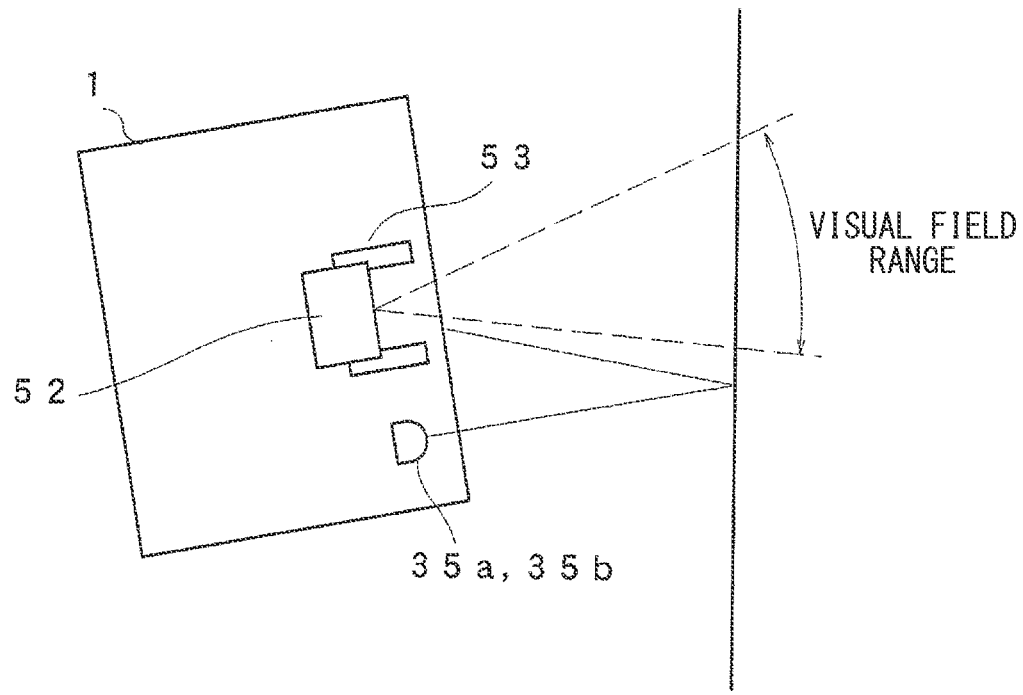
FIG. 15 is a schematic diagram illustrating a visual field range of the imaging unit and LED lighting.

Next, the camera holder 50 will be described. FIG. 13 is a perspective view of the two-dimensional code reader 1 of the present embodiment, and FIG. 14 is a central transverse sectional view of the two-dimensional code reader 1. As illustrated in FIGS. 2B, 13, and 14, in the camera holder 50, a cylindrical lens barrel 52 is provided, and a lens hood 53 is attached to an outer circumference of the lens barrel 52, and sighting markers 54a and 54b including a pair of LDs are disposed right and left in a slight upper portion. In this case, LEDs 35a and 35b mounted on the lighting board 35 are disposed right and left below the lens hood 53. As illustrated in FIG. 15, the two-dimensional code reader 1 is placed while slightly inclined with respect to a surface of a detection target object. When the LEDs 35a and 35b are disposed slightly below the lens hood 53, specularly-reflected light beams of light beams emitted from the lighting LEDs 35a and 35b hardly impinge in an imaging range in imaging the two-dimensional code that is of the detection target, which allows a decrease of a possibility that the light beams reflect in the captured image.

Figure 16:
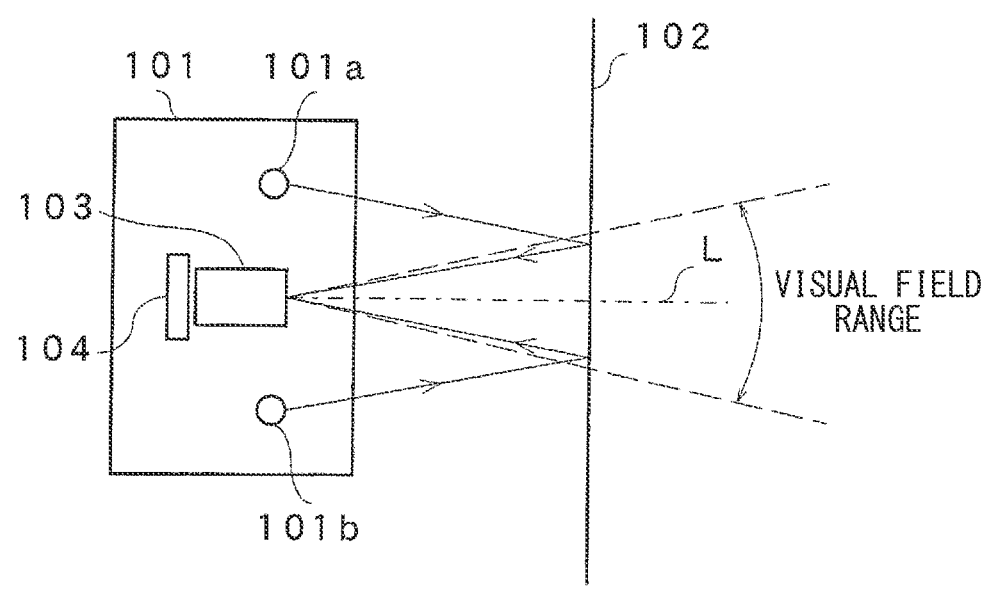
FIG. 16 illustrates dispositions of a conventional code reader and printing surface.

An influence of a reflection on the captured image of the two-dimensional code reader will be described compared with a conventional code reader that includes LEDs above and below. As illustrated in FIG. 16, a code reader 101 includes LED lights 101a and 101b above and below, and optical axes L of an optical unit 103 and an imaging element 104 are attached orthogonal to a printing surface of a two-dimensional code 102 or the like. In such cases, the specularly-reflected light beams of the light beams emitted from the upper and lower LED lights enter a visual field range of the imaging element 104, and the specularly-reflected light beams are received by the imaging element 104. That is, the specularly-reflected light beams reflect in the image. Because the extremely strong light beam is included in the captured image, it is difficult to correctly decode the two-dimensional code.

Figure 17:
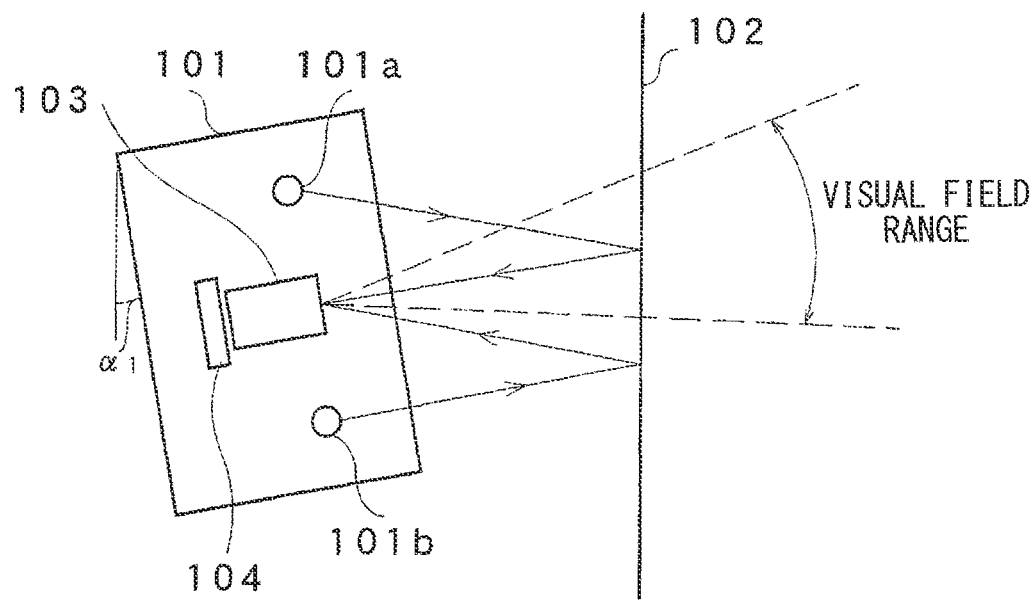
FIG. 17 illustrates a state in which the code reader is inclined by an angle $\alpha 1$.
Figure 18:
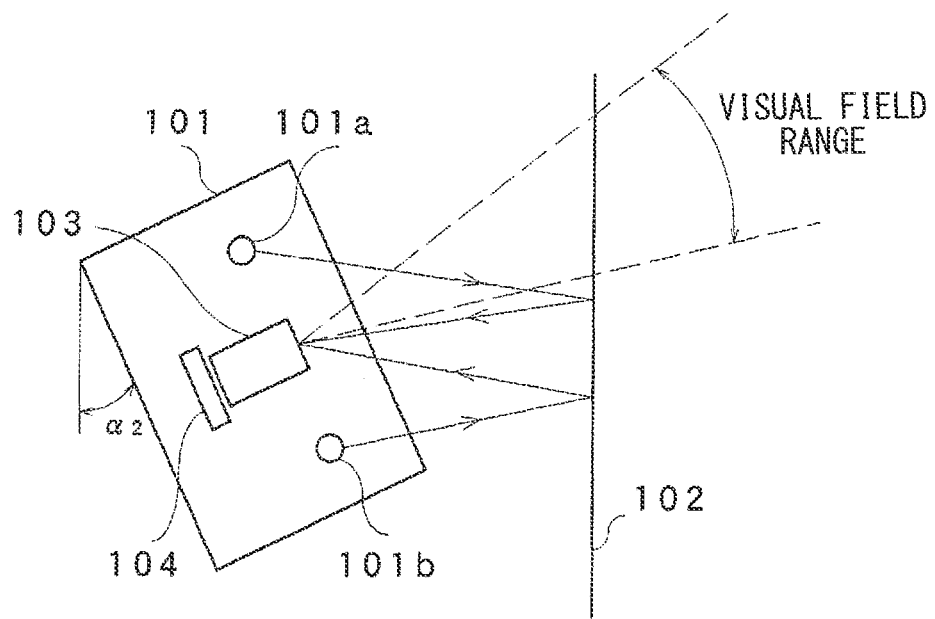
FIG. 18 illustrates a state in which the code reader is inclined by an angle $\alpha 2$.

As illustrated in FIG. 17, the code reader 101 is attached while inclined with respect to the printing surface of the two-dimensional code 102 or the like. When the code reader 101 is inclined by an attaching angle $\alpha 1$ as illustrated in FIG. 17, the lighting from the LED 101a still impinges on the imaging range while the lighting from the LED 101b strays from the imaging range. As illustrated in FIG. 18, when the code reader 101 is inclined by an attaching angle $\alpha 2$, the specularly-reflected light beams of light beams emitted from the LEDs 101a and 101b stray from the imaging range. A restriction to attaching of code reader is increased with increasing attaching angle of the code reader.

Therefore in the present embodiment, as illustrated in FIGS. 14 and 15, because the lighting LEDs 35a and 35 bare disposed only in the lower portion, a degree of freedom of attaching is easily secured. The space for LED is not provided in the upper portion, but the space for the sighting markers 54a and 54b is secured in the upper portion, so that the miniaturization can be realized in consideration of functionality.

In this case, the sighting markers 54a and 54b are attached while the optical axes thereof are oriented inward, and spots of the two laser beams are matched with each other when the two-dimensional code reader 1 is disposed at a position of a predetermined distance from the detection object. Accordingly, the distance between the two-dimensional code reader 1 and the detection object is set such that the spots are matched with each other, which allows the two-dimensional code reader 1 to be disposed at proper position. The sighting markers 54a and 54b may be attached while the optical axes of the sighting markers 54a and 54b are oriented outward. In such cases, a width of the visual field can be indicated.

As illustrated in FIG. 2B, the camera holder 50 is retained by the boss 11d of the bottom plate of the case 11, and the camera holder 50 is fixed by a screw from below.

Figure 19A:
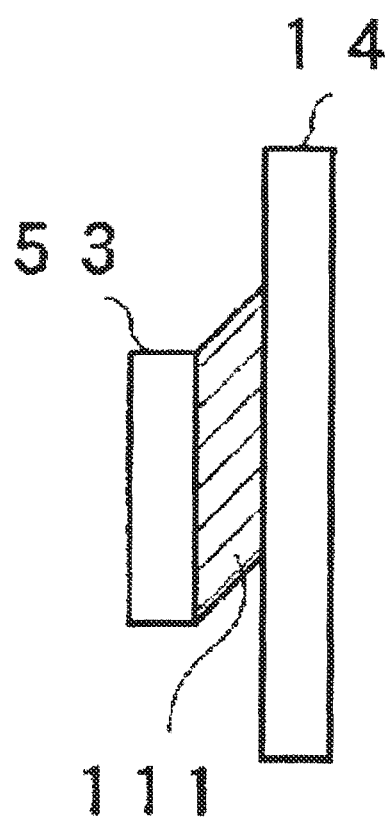
FIG. 19A is a schematic diagram illustrating a state in which a sponge is attached to a lens hood.

When a gap exists between the lens hood 53 and the glass plate 14, a flare is generated by stray light of self-lighting (LEDs 35a and 35b). Therefore, conventionally a sponge adheres in front of the lens barrel or a plastic member having a sliding property is provided, whereby the gap is filled to prevent the flare. However, when the gap is filled with a sponge 111, although the sponge 111 can easily be inserted because the sponge 111 contracts when being inserted in the case 11, the sponge 111 is pressed by the glass plate 14 and is still deformed as illustrated in FIG. 19A even if the sponge 111 is disposed at a predetermined position. As a result, an appearance may be degraded. On the other hand, when the sponge 111 is inserted without deforming the sponge, the difficulty of assembly is increased. When the gap is filled with the resin material having the sliding property, the appearance is not degraded. However, because the resin material does not contract in assembly, a gap is generated when the resin material is excessively thin, and a pressure is applied to the glass plate 14 when the resin material is excessively thick. Therefore, it is difficult to determine a thickness of the resin material such that the gap is completely filled with the resin material while the pressure is not excessively applied.

Figure 19B:
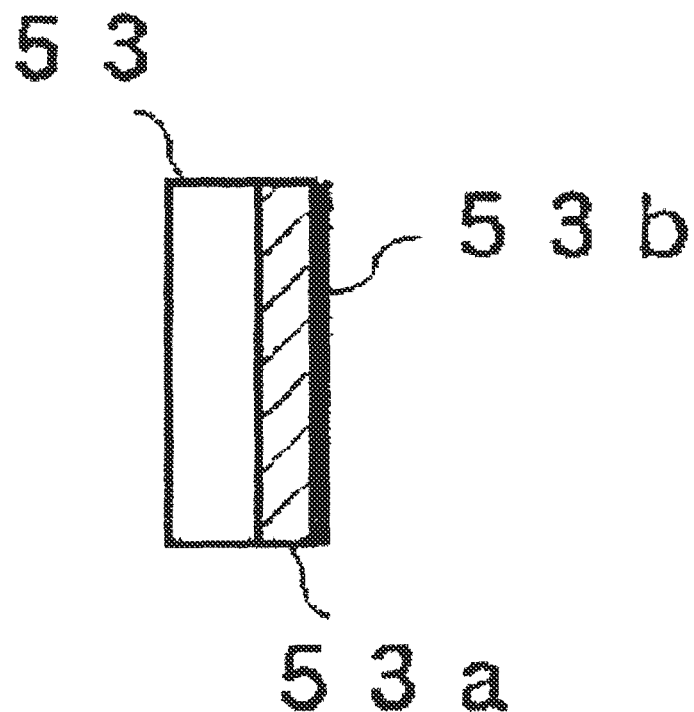
FIG. 19B is a schematic diagram illustrating a configuration of a lens hood of the present embodiment.

Therefore, in the present embodiment, as illustrated in FIG. 19B, a cylindrical elastic member, for example, a sponge 53a is provided in a leading end portion of the cylindrical lens hood 53, and a resin film, for example, a polyethylene film 53b is provided in the surface of the sponge 53a such that the lens hood 53 slides easily.

Figure 20:
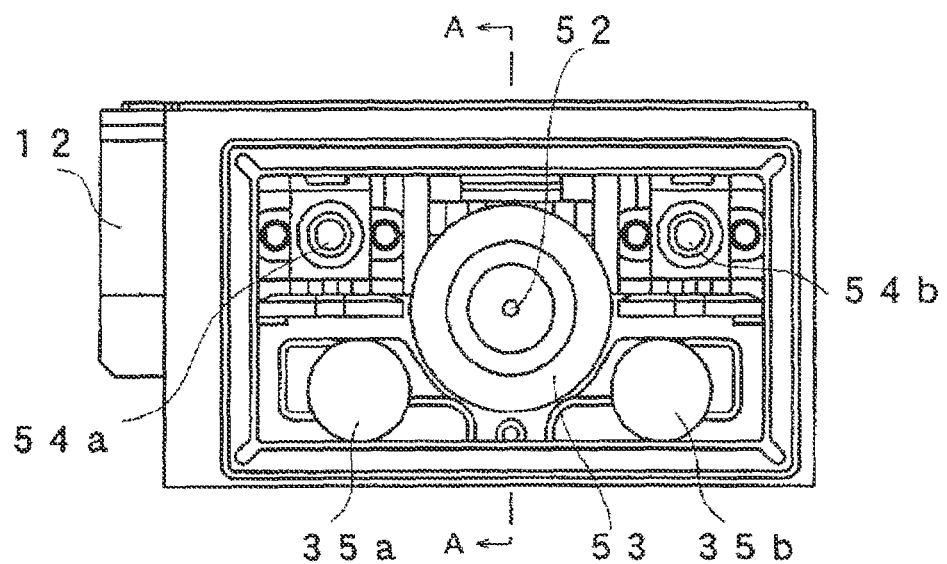
FIG. 20 is a front view illustrating a state in which the camera holder is attached to the case.
Figure 21:
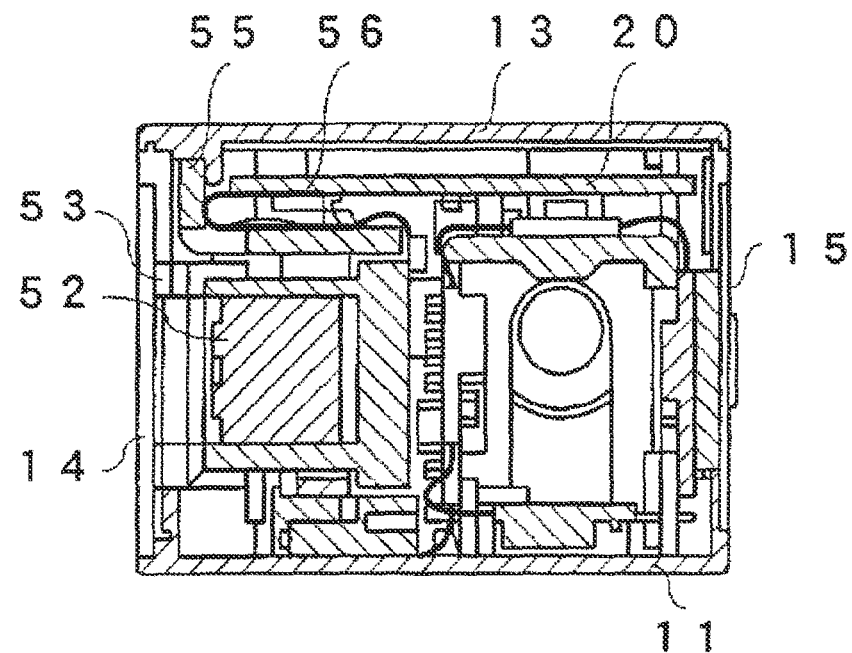
FIG. 21 is a sectional view taken along line A-A of FIG. 20.
Figure 22:
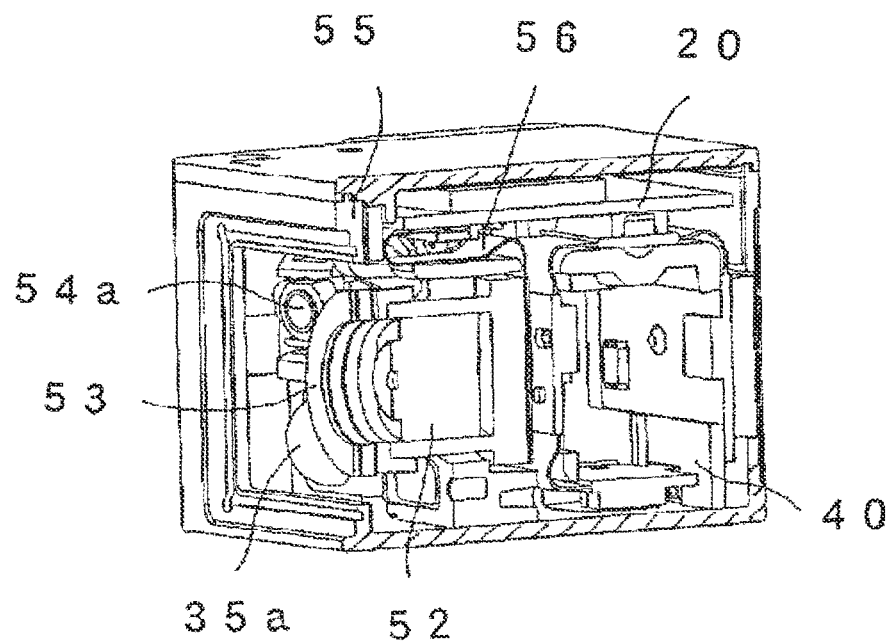
FIG. 22 is a perspective view illustrating a central longitudinal section.

A method for attaching the camera holder 50 having the above-described configuration to the case 11 will be described below. The glass plate 14 is attached to the light transmission window 11b of the case 11, and the camera holder 50 is inserted from above, the camera holder 50 is positioned at a predetermined position by the boss lid, and the camera holder 50 is fixed by a screw from below. FIG. 20 is a front view illustrating the state in which the camera holder 50 is attached. In this case, the surface of the lens hood 53 is formed by the smooth polyethylene film 53b, and the inside of the polyethylene film 53b is formed by a flexible sponge 53a. Therefore, the sponge 53a slides on the rear surface of the glass plate 14 while contracting, and the lens hood 53 is fixed at a predetermined position. Accordingly, the camera holder 50 is not attached while the sponge 53a is deformed, and the lens hood 53 is securely retained in the rear surface of the glass plate 14. At this time, as illustrated in the line A-A sectional view of FIG. 21 and the perspective view of FIG. 22, an L-shape arm 55 is positioned in the upper portion of the lens hood 53 of the camera holder while brought into contact with the rear surface of the case 11. The camera holder 50 is connected to the main board 20 through a flexible electric wire 56 as illustrated in FIG. 21. The arm 55 prevents the flexible card electric wire 56, located inside, from being seen through the glass plate 14 while preventing the inclination of the camera holder 50.

After the assembly, the cover 13 is closed, and the camera holder 50 and the frame body 40 are integrally sealed and fixed by two screws from below the case 11 as illustrated in FIG. 2B. FIGS. 8, 13, and 14 illustrate the sheet 15 attached to the display window 11c.

Next, the contact piece 25 of the main board 20 will be described. Metal is used as the housing of the two-dimensional code reader in order to improve the noise-resistant property, so as to shield the noise. Examples of the metal include aluminum, zinc, magnesium, and the like. Among others, magnesium is suitably used as the housing in order to realize the miniaturization, the weight reduction, and the securement of the sufficient strength. In the present embodiment, the case 11 and the cover 13 are produced by magnesium die casting. However, the main board 20 and the magnesium material come directly into contact with each other through the contact, a difference in ionization tendency is large because nickel-plating or tin-plating is usually performed to the contact, and possibly an insulating oxide film is generated when the main board 20, the magnesium material, and the contact come into contact with moisture. Accordingly, in the present embodiment, metals having a small difference in ionization tendency are brought into contact with each other to prevent the generation of the insulating oxide film.

Figure 23:
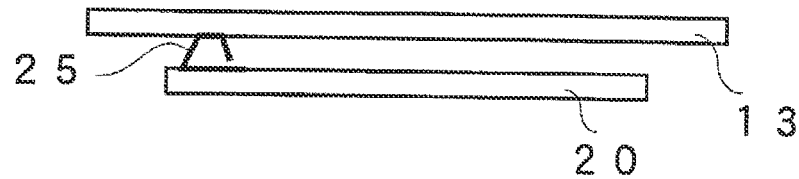
FIG. 23 is a front view illustrating a cover and the main board and a connection portion therebetween.
Figure 24A:
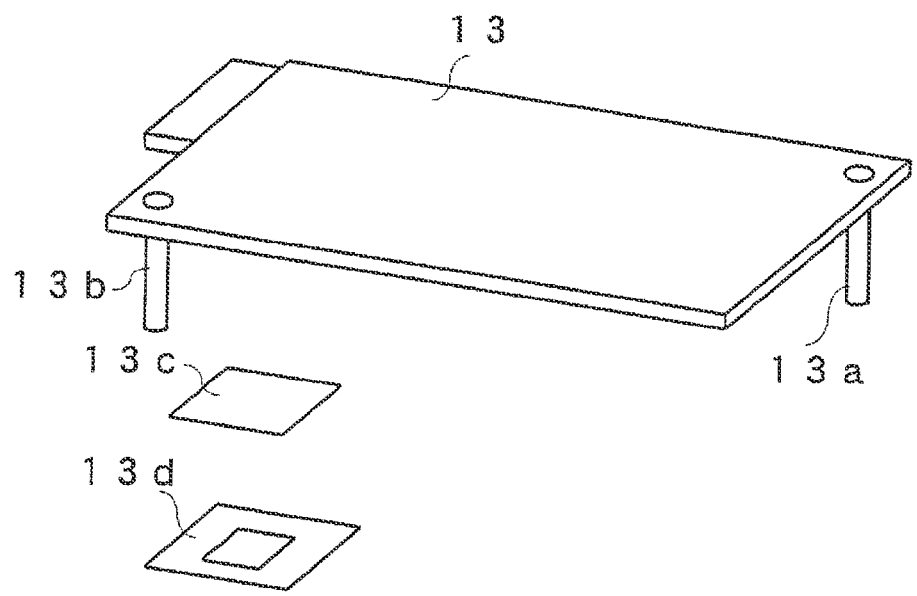
FIG. 24A is a perspective view illustrating the cover, and a zinc tape and a copper tape, which are attached to a rear surface thereof.
Figure 24B:
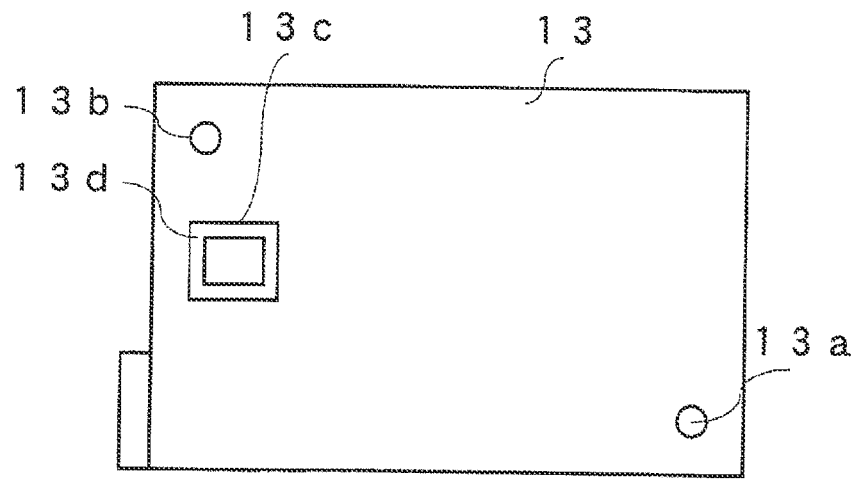
FIG. 24B illustrates a rear surface of the case.

In the present embodiment, as illustrated in FIGS. 2A, 8, and 23, the nickel-plated or tinned contact piece 25 is bent into a U-shape by the main board 20, and the contact piece 25 is projected so as to have an elastic property. A zinc tape 13c made of zinc adheres to the contact portion, which is opposite the contact piece 25, in the bottom surface of the magnesium cover 13 as illustrated in FIGS. 24A and 24B. The contact piece 25 and the zinc tape 13c are brought into contact with each other when the cover 13 is attached. In this case, a copper tape 13d having an opening that is slightly smaller than the zinc tape 13c adheres to the upper surface of the zinc tape 13c. Copper is selected as the metal having the ionization tendency smaller than that of the nickel, there is a large difference in ionization tendency between copper of the copper tape 13d and magnesium, and the contact surface between the copper tape 13d and the magnesium cover 13 is initially oxidized when the insulating oxide film is generated. Therefore, the insulating oxide film is not generated in the contact surface between the zinc tape 13c and the magnesium cover 13 until the contact surface between the copper tape 13d and the magnesium cover 13 is completely covered with the insulating oxide film. Accordingly, the insulating oxide film is not generated over the long term, but the main board 20 and the cover 13 can be brought into electric contact with each other.

Figure 25:
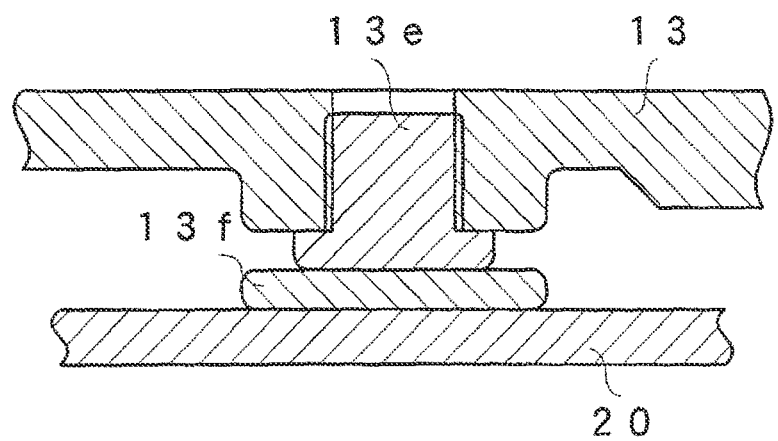
FIG. 25 is a sectional view illustrating a connection state between the case and the board.

Alternatively, as illustrated in FIG. 25, a tapped hole may be made in the cover 13, a nickel-plated screw 13e may be attached in the tapped hole from the inside, and the nickel-plated screw 13e may be brought into contact with the main board 20 while the nickel-plated or tinned contact 13f is interposed therebetween. Therefore, even if the magnesium material is used as the housing, corrosion can be prevented over the long term, and the electric conduction between the case and the board can be secured to retain the noise-resistant property.

As described above, in the present embodiment, the compact two-dimensional code reader having the small dead space is realized in consideration of the following points.

(1) In the imaging unit, the lighting LED and the laser marker are disposed around the lens barrel as illustrated in FIGS. 13 and 14. Therefore, the size of the imaging unit is formed equal to the size of one of the surfaces of the housing.

(2) The main board, on which the CPU and the memory are mounted, having the largest area as the board is disposed near the internal wall of the housing for the purpose of heat radiation countermeasure. The entire size of the housing is determined based on the sizes of the imaging unit and the main board to realize the optical information reader having the minimum size.

(3) Other functions are functionally divided into sub-boards based on the signal branching and individual function and disposed around a frame body. As illustrated in FIGS. 14 and 13, the connection portion to the cable is accommodated in the frame body to decrease the dead space as much as possible. Therefore, the miniaturization is realized.

(4) The camera module of the optical system is fixed in the housing, which enables the positioning to be performed with high accuracy.

In the present embodiment, the two-dimensional code reader is described by way of example. However, the optical information reader of the present invention is not limited to the two-dimensional code reader. For example, the optical information reader of the present invention can be applied to various optical information readers that read the two-dimensional image information.

The present invention relates to the optical information reader that optically decodes the two-dimensional code and the like with the two-dimensional imaging element, and the present invention can suitably be used to the application, in which the optical information reader is disposed near the conveyance line of the object, the two-dimensional code or barcode that adheres to or is printed or stamped in the surface of the object moving along the conveyance line is read to identify the moving object by the decoded two-dimensional code or the like.

What is claimed is:

1. An optical information reader comprising:
   an imaging unit including a two-dimensional imaging element that images a reading target;
   a signal processing unit that processes a signal from the imaging unit corresponding to the reading target;
   a power supply unit that supplies electric power to the imaging element and the signal processing unit;
   a cable that is connected to the signal processing unit and the power supply unit;
   a housing that includes a light transmission window; and
   a frame body that is detachably fixed to an inside of the housing, wherein
   the signal processing unit and the power supply unit include a plurality of boards being disposed so as to surround the frame body,
   one end of the cable is secured in the frame body, and
   the imaging unit is accommodated located between the light transmission window of the housing and the frame body.

2. The optical information reader according to claim 1, wherein
   the signal processing unit and the power supply unit include a main board and sub-board,
   an electronic circuit of the signal processing unit that processes the signal from the imaging unit is mounted on the main board,
   the sub-board includes a rigid flexible board that joins:
      an I/O board on which a connection terminal of the cable, a communication circuit unit, and an input/output interface circuit are mounted;
      a power supply board including the power supply unit that supplies power to each unit;
      a coupling board on which a connector is mounted to connect the main board;
      a display board on which an element displaying an operating state of a two-dimensional code reader is mounted; and
      a lighting board on which a lighting element is mounted to light a region for imaging with a camera module, using a planar conduction unit,
   the I/O board, the power supply board, the coupling board, and the display board are disposed so as to surround the frame body, and
   the lighting board is disposed so as to be located in front of the power supply board.

3. The optical information reader according to claim 2, wherein
   the coupling board is retained above the frame body, and
   the main board is fixed to the frame body after the coupling board is connected to the main board through the connector, whereby the coupling board is fixed while being sandwiched therebetween.

4. The optical information reader according to claim 2, wherein
   a cylindrical elastic member is provided at a leading end of the lens barrel of the lens holder,
   a surface of the elastic member is made of a resin material.

5. The optical information reader according to claim 3, wherein
   the housing is made of a magnesium material,
   the housing includes:
      a zinc tape that adheres to an internal wall of the housing; and
      a copper tape that has an opening in a center thereof, the copper tape adhering to the
   zinc tape, and
   the main board includes a contact that is projected from the internal wall of the housing to come into contact with the zinc tape.

6. The optical information reader according to claim 3, wherein
   the housing is made of a magnesium material, and
   a screw is attached from an inside of the housing to mount a contact on the main board, the contact having a nickel coating that comes into contact with the screw.

7. The optical information reader according to claim 1, wherein the imaging unit includes:
   a camera module in which the two-dimensional imaging element is disposed in a lens holder;
   a pair of lighting units that lights the reading target, the lighting units being disposed while deviated downward from a lateral portion of a lens barrel of the camera module; and
   a pair of positioning markers that indicates specifies an imaging position of the camera module, the positioning markers being disposed while deviated upward from a lateral portion of the camera module.

8. The optical information reader according to claim 1, wherein said frame body has a front facing said light transmission window and said imaging unit is located between said front and said light transmission window such that a reflection in front of said imaging unit is suppressed.

9. The optical information reader according to claim 1, wherein said frame body has a front facing said light transmission window and said imaging unit is located between said front and said light transmission window.

* * * * *